United States Patent [19]

Finello

[11] Patent Number: 5,791,082
[45] Date of Patent: Aug. 11, 1998

[54] UNIVERSAL CHRISTMAS TREE WATER DELIVERY SYSTEM USING GRAVITY REGULATED FLOW

[76] Inventor: Keith Finello, P.O. Box 991, Sierra Madre, Calif. 91025

[21] Appl. No.: 747,756

[22] Filed: Nov. 13, 1996

[51] Int. Cl.⁶ .................................................. A47G 7/02
[52] U.S. Cl. ........................... 47/40.5; 220/571; 220/404
[58] Field of Search ........................... 47/40.5; 220/571, 220/410, 404

[56] References Cited

U.S. PATENT DOCUMENTS

| | | |
|---|---|---|
| 114,638 | 5/1871 | Booher . |
| 1,009,437 | 11/1911 | Patnaude . |
| 1,273,639 | 7/1918 | Lyons . |
| 1,453,401 | 5/1923 | Mattson . |
| 2,183,970 | 12/1939 | Meissl . |
| 2,500,215 | 3/1950 | Swearingen . |
| 2,531,690 | 11/1950 | Kennel . |
| 2,799,121 | 7/1957 | Modeweg . |
| 2,938,304 | 5/1960 | Thomas et al. . |
| 2,983,076 | 5/1961 | Merrill . |
| 3,137,969 | 6/1964 | Sokol . |
| 3,262,612 | 7/1966 | Tabor . |
| 3,469,342 | 9/1969 | Morris . |
| 3,505,760 | 4/1970 | Ambrose . |
| 3,562,951 | 2/1971 | Schwaderlapp . |
| 3,697,026 | 10/1972 | Hambrick . |
| 3,802,007 | 4/1974 | Dolan, Jr. . |
| 4,085,546 | 4/1978 | Hallar . |
| 4,087,938 | 5/1978 | Koch . |
| 4,126,963 | 11/1978 | Dunbar . |
| 4,291,836 | 9/1981 | Chen-Hsiung . |
| 4,347,687 | 9/1982 | Sibbel . |
| 4,368,869 | 1/1983 | Gelvezon et al. . |
| 4,593,874 | 6/1986 | Dunagan . |
| 4,610,356 | 9/1986 | Porter et al. . |
| 4,653,224 | 3/1987 | Weckess ...................... 47/40.5 |
| 4,739,898 | 4/1988 | Brown . |
| 4,850,137 | 7/1989 | Foster . |
| 5,279,071 | 1/1994 | McDougall .................. 47/40.5 |
| 5,582,310 | 12/1996 | Del Zotto ..................... 220/571 |

*Primary Examiner*—Michael J. Carone
*Assistant Examiner*—Joanne C. Downs
*Attorney, Agent, or Firm*—Kelly Bauersfeld; Lowry & Kelley, LLP

[57] ABSTRACT

A simple, decorative design for a continuous flow gravity regulated water delivery system. The system uses no moving parts or electrical components. The system will automatically fill and then maintain the water level in any Christmas tree stand water pan. The container design is one-piece, seamless, and leakproof. The container design is suitable for injection molding. A false bottom allows the integral water exit nozzle to be recessed and hidden, and keeps the minimum system water level above the tree stump cut. The container is designed to be tip proof and hold approximately 2 gallons of water, large enough to be functional yet unobtrusive. The container has an injection molded lid which fits snugly but does not seal, allowing the necessary pressure equalization. Water is delivered to the tree stand via a small (¼" nominal diameter) clear vinyl tube. A small spring is inserted in the water exit nozzle on the container and extends into the tubing to prevent kinking at the bend. The tubing is weighted at the free end and placed in the bottom of any tree stand pan.

The system is applicable to other similar water delivery applications. A water bowl and a combination water bowl and liner are also illustrated.

The system design strongly addresses production manufacturing concerns while emphasizing simplicity. The design minimizes production costs, while satisfying the objectives and criteria for user function, safety and convenience.

3 Claims, 2 Drawing Sheets

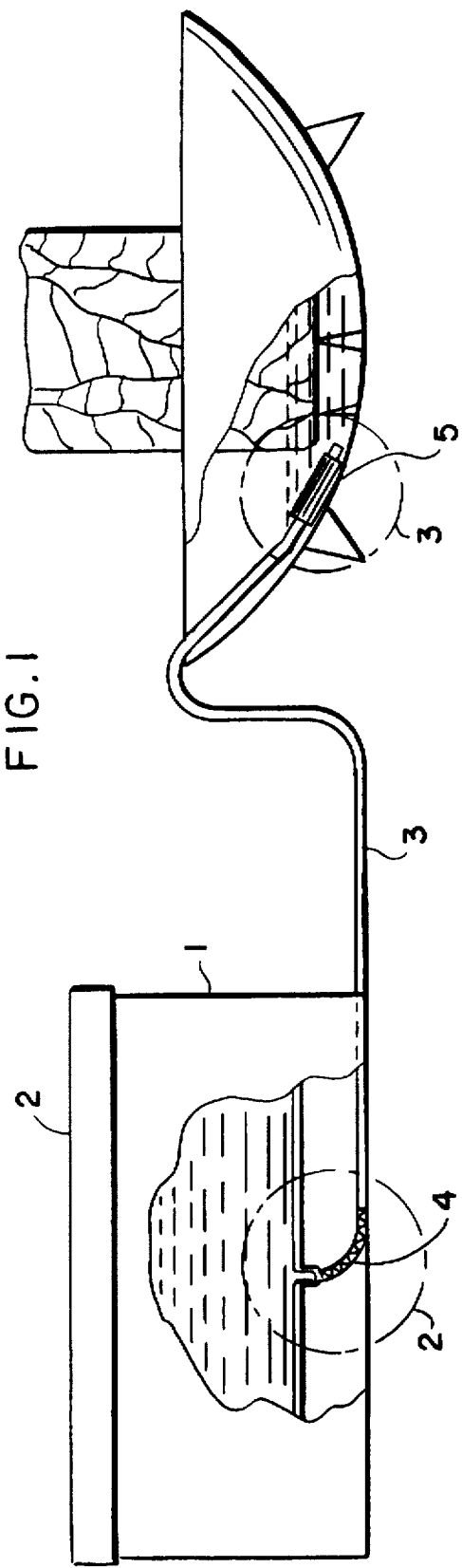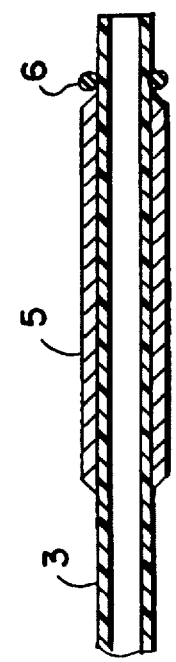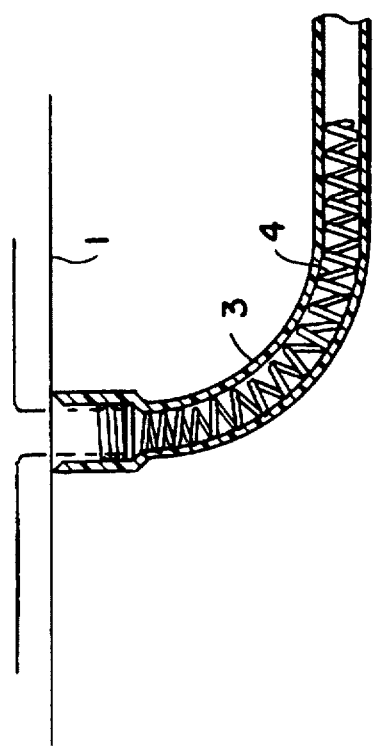

UNIVERSAL CHRISTMAS TREE WATER DELIVERY SYSTEM USING GRAVITY REGULATED FLOW

BACKGROUND OF THE INVENTION

This invention is related to devices which deliver water to Christmas tree stand water pans.

A living Christmas tree which is cut and mounted on a stand will dry out relatively quickly if it is not placed in water. Live tree stands have a water reservoir, hereafter referred to as the "tree stand pan," which requires refilling due to evaporation and absorption by the tree. All such tree stands require water maintenance by the user, sometimes even daily. The size of the tree stand pan severely impacts the cost of the tree stand, and frequently the tree stand pan is too small to serve the needs of the tree.

Although there is some controversy in the research literature regarding water absorption by cut trees, it is generally agreed that once the tree is cut, it will only absorb water for a limited period, and this period will be shortened if the cut is allowed to dry. It is widely believed that a cut Christmas tree will stay "fresher" (i.e. retain moisture in its system) longer if the water level in the tree stand pan is maintained. It is important that this level be maintained sufficiently high to immerse the stump cut. Maintaining the water level in the tree stand pan becomes even more difficult once the tree is decorated and access to it is blocked by gifts. Often, the result is a dry tree, which is a greater fire hazard.

Patents on devices and systems which address the problem have been issued, but the prior art is mostly too complex or does not address the ability to mass manufacture such a device. The cost and reliability, especially with regard to leakage, have not been adequately addressed in the prior art. The prior art fails to weigh cost, reliability, visual appeal, and manufacturability, against the complexity of the design and its component parts.

Although a device serving this purpose would appeal to many consumers, to date no commercial success has been achieved with such a device. The final retail cost, the appearance, and the reliability of the device are important considerations, and a strong argument for simplicity in the design. Real life conditions, such as water hardness deposits, dirty, debris laden water in the tree stand pan, air bubbles, leaks and the many different types of tree stands already in use should be considered in the design. This is especially true since the device must be put away and reused year after year.

Similar prior art using automatic gravity flow can be placed in two categories, described here as "vacuum break" and "continuous flow."

Vacuum break systems require that the source reservoir be air tight. A partial vacuum develops in the source reservoir which stops the flow of water. Air is then allowed by some means to enter the source reservoir. This relieves the partial vacuum and allows water to flow. Vacuum break systems can be easily recognized by their bubbling and gurgling noises.

Continuous flow systems allow the source reservoir to be at atmospheric pressure. The source reservoir and target reservoir, which are open to the atmosphere, are connected with water by a conduit. The force of gravity causes the water levels in the source reservoir and the target reservoir to be the same. Water level is here defined to be the height above any horizontal reference level, such as the floor.

In addition to having the advantage of being silent, continuous flow systems offer several advantages toward simplicity in this application. In continuous flow systems, the source reservoir need not hold a vacuum, therefore no seals are required at the water fill opening.

In continuous flow systems, both reservoirs are at the same level. There is no turbulent rush of water and air to splash and stir up debris in the tree stand pan. If the source reservoir is covered to minimize evaporation, the flow reaches a slightly positive equilibrium, with a very slight flow always toward the tree stand pan.

When the rush of flow occurs, stirring up the debris, vacuum break systems simultaneously draw back an air and dirty water mixture toward the source reservoir. This makes vacuum break systems subject to both plugging, and contamination of the source reservoir. Further, in vacuum break systems, a seal leak, loose cap, or other malfunction empties the source reservoir, potentially resulting in an overflow condition.

Vacuum break systems, for the reasons noted above, will not be cited in this disclosure, with the one exception.

U.S. Pat. No. 5,009,028 to Lorenzana is this exception. This interesting apparatus combines both vacuum break and continuous flow principles by allowing a vacuum break at the source reservoir container. This is allowed to create a very small open source reservoir beneath it to deliver water to the tree stand pan via continuous flow. The design utilizes a standard plastic soda bottle as a main reservoir above the vacuum break. Unfortunately, it is noisy as it bubbles frequently due to its tiny source reservoir. The surface area to volume ratio is very high for the tiny source reservoir water, which is open, so that local evaporation loss alone contributes to break the vacuum. Total system capacity is small, only two liters. The system is very tall and top heavy with respect to its base and is relatively unstable. It could very easily be tipped over. There is no retention mechanism for the free end of the tubing. No decorative aspect is addressed. It is recommended that the source reservoir unit be hidden, so it could be easily forgotten and be empty.

U.S. Pat. No. 5,369,910 to Copenhaver is a complete system including a particular folding tree stand. The custom tree stand pan is filled from the bottom through a nozzle. Although economy and ease of manufacture is a stated consideration, very little attention is given to the design of the "watering box." It is not clear how the stated objectives ("low cost of manufacture," "easily and efficiently manufactured", "leakproof", etc.) are realized. A valve is also specified and adds expense and a potential problem in the real life conditions noted earlier.

U.S. Pat. No. 5,201,140 to Voorhis also includes a particular customized tree stand with its own fill nozzle at the bottom. The container uses a potentially unreliable coupling, and spigot valve. Some attention is given to how the source water container with coupling end would be manufactured, and blow molding is suggested. But blow molding, by the nature of the process, would yield a very weak container of that size which could be easily dented, and broken or damaged.

U.S. Pat. No. 5,157,868 to Munoz is of a more similar scope to this disclosure but exceeds the design requirements of this art. The device becomes excessively complex. U.S. Pat. No. 5,157,868 to Munoz can not be manufactured at a reasonable cost. Nor does U.S. Pat. No. 5,157,868 to Munoz address the design and fabrication problems associated with leakage of the container, and the nozzle. U.S. Pat. No. 5,157,868 to Munoz also incorporates various extra elements which are not necessary. These include a level detection column, a cover seal, air inlet check valves, a protective mesh, and a crush-proof collar.

SUMMARY OF THE INVENTION

The objective is to provide a simple, safe, convenient method of maintaining the water level in any tree stand the user might choose to have. The system is to be of universal application. The system design must also be feasible to mass produce at a reasonable cost. A design which would ultimately cost more than say, $7 to produce would result in a retail price well over $25; common sense would indicate that the average consumer would reject the product.

The design disclosed herein accomplishes this objective under the following design criteria:

1. The design is universal. It provides a simple means to maintain the water in a variety of commercially available Christmas tree stands, using a minimum number of parts, and no moving parts or batteries.
2. The design eliminates the possibility of clogging. It provides a system which uses continuously positive gravity driven flow at a very small flow rate. The design of the system keeps the dirty water well isolated from the clean water supply.
3. The design provides a covered, easily accessible water container which does not need seals, can not be tipped over, and which is shallow enough to not be a drowning or significant accident hazard.
4. The design provides a one piece, seamless water container which may be easily and inexpensively manufactured using standard plastic production methods. The water exit nozzle is integral, and designed to be hidden and safely protected from damage and/or breakage. This is an important design consideration for inexpensive mass production of a reliable, leakproof product. This important problem has not been adequately addressed in the prior art.
5. The design provides a system which is self starting, and without further action by the user, fills the tree stand pan, and maintains a minimum system water level above the bottom cut of the tree trunk.
6. The design provides a system that is simple. It is easy to assemble, set up, and maintain. The system is silent. There are no moving parts, valves, or electrical requirements.
7. The design can provide at a very reasonable cost a system which is pleasing to the eye and visually pleasing and compatible with its surroundings.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 shows the complete system in place, with a generic Christmas tree stand pan. (Part#'s 1 through 6)

FIG. 2 shows two detail views to clarify assembly and function. Detail A shows the relationship of Part#'s 1, 3, and 4. Detail B shows the relationship of Part#'s 3, 5 and 6.

Reference Numerals in Drawings

Figure 3A:
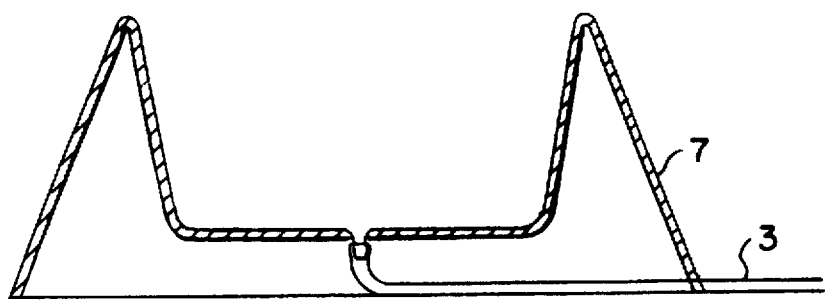
FIG. 3 shows three details illustrating the pet water bowl application discussed in the Summary, Ramifications, and Scope section.

1 Container
2 Lid
3 Tubing
4 Spring
5 Weight
6 "O"-Ring
7 Water Bowl
8 Water Bowl Liner

DESCRIPTION OF THE PREFERRED EMBODIMENT

The water delivery system as disclosed herein is shown in FIG. 1. It consists of six parts.

Part#1 is the container, which must be molded to be one-piece and seamless. The dimensions and the size of the container are important, and have not been addressed in prior art. The dimensions of the container are is especially important in consideration of universal application, since it is desired that the system should work with any tree stand pan. Proper sizing of the container keeps the system simple while accomplishing the design objectives. The optimum container dimensions were calculated based on a review of tree stands currently in use. The height, length and width have been carefully selected for this application in order to:

1. Allow the initial water level to be high enough to initiate flow to the tree stand pan as the container is filled.
2. Allow the water level in the container to drop low enough so that flow reaches a positive equilibrium as the tree stand pan is filled.
3. Maintain sufficient volume of water in reserve in the container once positive equilibrium is reached, and the tree stand pan is full.
4. Keep the container tip-proof, i.e. low height and center of gravity relative to the size of its base.
5. Insure that the tree stump cut is always in water.
6. Keep the water in the container as shallow as possible so as to minimize drowning hazard.

Based on the above considerations, the size selected for the container was approximately ten inches square by seven inches high. Overflow of the tree stand pan during the filling process was a consideration in limiting the optimum height against the volume contained. The container has a raised ("false") bottom, with the water exit nozzle in the vertical. in this application the raised bottom is approximately one and one half inches above the visually apparent bottom, creating an enclosed air space or void beneath the container (FIG. 1.) The following advantages result, which make this design novel and superior compared to the prior art:

1. The water level needed to achieve positive flow equilibrium is maintained with less volume of water in the container, it is more shallow, and drowning hazard is reduced. The volume of water in the container is fully used. There is no dead water space, as there would be below the centerline of a horizontal nozzle. If any additives (vitamins, preservants, etc.) to extend tree life are periodically added to the water, concentrations can be more easily controlled. As will be explained in Item 3 below, the additional dead water is also undesirable for another reason.
2. In all tree stands, the tree stump cut is mounted at some distance above the floor. This distance is typically about one inch. The raised bottom of the container fixes the minimum system water level at approximately one and one half inches above the floor. Thus when the container appears to be nearly empty, there is still one and one half inches of water level in the system. This provides a useful margin of safety to the user, and helps insure that the tree stump cut remains immersed.

3. The water in the tree stand becomes dirty and somewhat stagnant. The raised bottom of the container keeps the dirty water at a maximum level below the clean water in the container. Also, flow is always positive out from the container. This makes it even more difficult for contaminated water to migrate back up to the container. The water in reserve in the container stays very clean. This is also an important concern and advantage for the pet water bowl embodiment discussed later, especially over extended periods where contamination of the source water becomes a concern.

4. The water exit nozzle is the most critical area of the container, in terms of possible damage and leakage. It is located at the approximate center of the false bottom of the container. The design keeps the nozzle hidden, leakproof and efficiently manufacturable. The injection mold needed to mass produce the container with this design need open and close only in one direction (axially). This reduces costs in production time and the complexity of the mold design.

Part#2 is the lid for the container. It is designed to fit snugly but it does not seal. This design very simply and inexpensively affords protection against spillage, yet allows the very small amount of air necessary to enter the container as the water level slowly drops.

Part#3 is the tubing which runs from the container water exit nozzle through a slot in the base of the container to the tree stand pan. The tubing is ¼" nominal diameter, thin wall, clear vinyl tubing. The clear tubing allows an easy check that the container and the tree stand pan are continuously interconnected with water, and that no trapped air bubbles have caused them to be disconnected. The diameter of the tubing was selected based on ease of handling, flexibility, cost, and to achieve a slow but adequate flow rate.

Part#4 is shown in FIG. 1 and in FIG. 2, Detail A. It is a cylindrically shaped, helically wound wire spring which assures the tubing will bend beneath the false bottom of the container without kinking. Stainless steel is the preferable material based on cost and corrosion resistance. As can be seen in FIG. 2, Detail A, the spring is designed so that it can be force fit into the nozzle on the container. Since the spring is fixed to the nozzle, in a secondary function it acts as a retainer for the tubing and helps insure that the tubing will not slip off the water exit nozzle.

Other applications, as discussed later, where the raised floor of the container is of a different height, and/or where different tubing is used, may not require this part.

Part#5 is shown in FIG. 2, Detail B. It is a weight which slips over the free end of the tubing to keep the tubing in the bottom of the tree pan. This simple yet novel method of fixing the free end insures that the tubing stays at the bottom of the tree stand pan, where it should be. The task will be quick and easy for any tree stand. This method best serves the objective for the design to be universal, since the user merely places the weighted free end into the tree stand pan. The use of clips or other attachment methods which might cause the user problems with a particular tree stand is eliminated. The design uses a standard ⅛"×2" brass pipe nipple, which is dense, corrosion resistant, inexpensive, and readily available.

Part#6 is an elastomer retaining ring which fits tightly on the end of the tubing to keep the tubing from slipping back through the weight, in the case that the hole might be slightly larger than the tubing because of fabrication tolerances. There is no requirement for a seal against water or air, its purpose is solely mechanical retention. An industry standard rubber "O"-ring is the ideal choice for this service based on durability, thickness, and cost.

The assembly of the six parts is simple and straight forward. The container (Part#1) is inverted (bottom up) and the spring (Part#4) is firmly inserted into the water exit nozzle. One end of the tubing (Part#3) is then slipped over the spring and stretched over the nozzle, and pushed toward the container bottom until the end of the tubing is in contact with the container bottom. (See FIG. 2, Detail A) The tubing is then routed through the keyhole slot at the base of the container. The container is again inverted (bottom down) and placed on the floor at a convenient location around the base of the tree. The weight (Part#5) is then slipped on the free end of the tubing. The "O"-Ring (Part#6) is slipped over the end of the tubing, approximately one quarter inch from the end. The weight is then slid back toward the free end until it contacts the "O"-Ring. (See FIG. 2, Detail B). The weighted end of the tubing is then placed in the tree pan.

The container is then filled with water. As the container is filled, the water level in the tubing will be observed to rise, until the water level in the container reaches the level of the rim of the tree stand pan. As more water is added to the container, water will begin to flow slowly from the container to the tree stand. If the container is then filled with water, it will automatically fill a one gallon tree stand pan and reach positive equilibrium over a thirty minute period. Most of the commercially available tree stand pans hold about one gallon of water. If the tree stand pan being filled holds significantly more or less water, then the amount of water added to the container once the flow starts may be adjusted accordingly. When finished adding water to the container, the lid (Part#2) is put on the container.

As stated in Item 6 of the Objectives and design criteria, it is desirable that the system be decorative. Since the container and lid (Parts#1 and#2) are injection molded styrene plastic, a colorant may be added during production so that the container and lid assembly is colorful and decorative. For example, the container may be red, and the lid white. A stick-on bow may be placed on the lid so that the container and lid assembly resembles a Christmas present.

Part#7 (FIG. 3A, B, C) is a pet water bowl which may be maintained as a target reservoir instead of a tree stand pan. The design objectives associated with such a system would be nearly the same. The gravity feed water delivery system as disclosed provides an excellent means of maintaining the water in the pet bowl. The dimensions of the container may change slightly for optimum performance, since the water levels and volumes needed for water bowls and the like would not necessarily be the same. Part #'s 5 and 6, the weight and "O"-ring, may or may not be used, depending on the design of the water bowl.

Figure 3B:
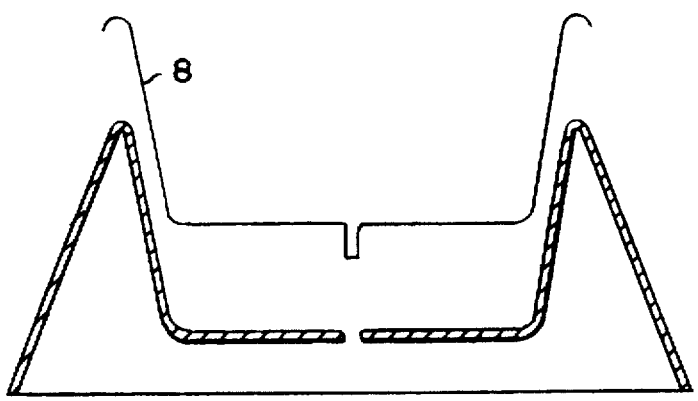

Part#8 (FIG. 3B, C) is a design for a disposable liner which can be is used with a water bowl maintained with the disclosed system. The liner itself has a nozzle which is connected to the system tubing. Part#'s 5 and 6, the weight and "O"-ring, are not be used with the liner.

Operation—FIG. 1

The gravity regulated continuous flow system disclosed operates on the principle that gravity will cause water to flow between interconnected bodies of water open to the atmosphere, until equal levels are reached with respect to a fixed horizontal reference line.

The container (Part#1) and the tree stand are placed at the same level, typically but not necessarily, on the floor. The container is located at an easily accessible point away from the tree. The weight (Part#5) on the end of the tubing (Part#3) is placed in the tree pan. The act of filling the container with water above the level of the tree stand pan rim automatically starts the flow to the tree stand pan. The lid (Part#2) is placed on the container. The flow rate slows as the tree stand pan fills while the water level in the container drops. The flow rate reaches nearly zero and a slightly positive flow equilibrium state is reached when the two levels are equal. The flow is always slightly positive toward the tree stand pan since absorption and evaporation water losses are always the greatest there. As water is gradually used and removed from the system, the system water level slowly drops.

The total system water capacity will vary depending upon the capacity of the tree stand pan, but is typically is about two gallons. Certain tree stand pans have only one tenth this capacity and the user benefits are enormous. The total capacity of the system is shared by the tree stand pan and the container. Two gallons of water will typically last for a few days or less at first, then longer after about a week. It is recommended the clear tubing be checked periodically to be sure the container and tree stand pan are connected by water. This can be determined easily by a glance at the tubing. Should disconnection occur, the system can be easily re-connected simply by momentarily raising the container and its water level above the rim of the tree stand pan.

System water level can likewise be easily checked either by lifting the lid of the container, or by looking through the sides of the container, which by nature of the plastic material are somewhat translucent, or by looking at the tree stand pan itself. The user need only understand that the water level in the tree stand and in the container are at the same level. As the tree uses water, and by evaporation, the system water level in both the container and the tree stand pan slowly drops. As needed, the lid is removed, and water is added to the container to restore the system level to the desired height.

Although extreme, a tree stand pan may have a very high rim, which prevents the flow from the container from starting even if the container is completely full. In this case, container is raised just enough to start the flow, then lowered back down. The system will then work normally.

Only four parts (Part#'s 1, 2, 3, and 5) actually constitute the essence of this disclosure. Part#4 (spring) and Part#6 ("O"-Ring) are not crucial to system operation, but are included as inexpensive insurance that the product can be mass produced with industry standard tolerances and perform optimally in varied circumstances without attention by the user.

Summary, Ramifications, and Scope

The disclosed gravity regulated water delivery system provides a universal, simple, safe, and silent means of automatically filling and maintaining the water level in any Christmas tree stand pan. The system can be easily manufactured reliably and inexpensively.

The covered reservoir container is carefully and optimally sized, seamless, and leakproof. The one piece container and nozzle has a raised false bottom, which creates an enclosed air space or void beneath the water container. Depth of water needed in the container is minimized, so the drowning and accident hazard is reduced. The water exit nozzle is oriented vertically, hidden and protected beneath the container. The container and nozzle are integral and designed to be produced by standard plastic injection molding techniques.

Clear vinyl tubing delivers water to the tree stand pan and allows easy inspection and status of the system operation. A small spring fixed in the nozzle on the container extends into the tubing to insure the tubing does not collapse at the bend leaving the water exit the nozzle. The weighted end of the tubing installs easily and correctly in any tree stand pan. The system has no moving parts or electrical requirements, components, and is designed to be safe. The system is unobtrusive and visually pleasing in its surroundings.

System operation is automatic, continuous, and silent. The system works by continuous positive flow and will not plug with debris or contaminate the source water in the container. During operation, the design insures the tree stump cut always remains immersed.

This device may be used either in the form presented, or modified slightly to deliver water anywhere that a level of water need be maintained. The container design may be modified so that the raised bottom of the container may be raised or lowered, depending upon the application. The size of the nozzle and tubing may be changed to suit other applications.

This system can be useful for maintaining water levels in small aquariums, terrariums, bird baths, other types of live or cut plant containers, and especially pet water bowls.

The design is especially effective as a reservoir for a vacation pet water bowl, or a large dog daily water bowl. As previously discussed concerning the container and system design, very little contamination occurs in the source container. The weighted end of the tubing could be used as shown in FIG. 1, with the pet water bowl in place of the tree stand pan. If there were a risk associated with the weight being pulled out of the bowl the tube could be fixed in a cutout recess in the top rim of the bowl.

Alternatively, the pet water bowl, like the container, could be provided with a small hidden water feed nozzle at the bottom, and a keyhole slot at the base of the bowl. (FIG. 3, Detail A) The tubing would run as before, from the container through the keyhole slot on the container, through the keyhole slot on the pet bowl and then attach to the water feed nozzle. Water would then be continuously supplied to the pet water bowl, as it was to the tree stand pan.

Concentrations of certain water additives, (vitamins, medication, etc.) as discussed for tree stand pans, may be even more critical for animals. A container design where the entire volume of water is used provides a distinct advantage.

Figure 3C:
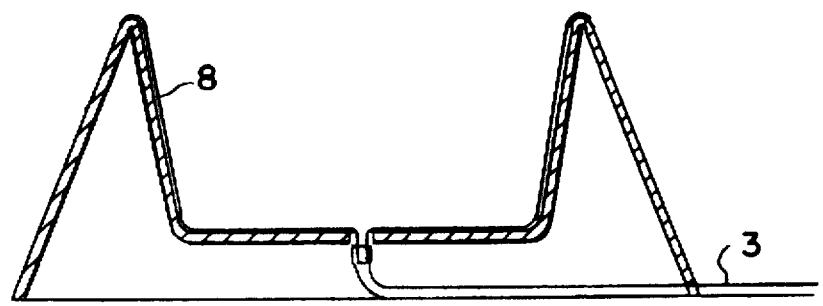

Pet water bowls quickly become dirty and slimy. Alternatively, a disposable seamless thin plastic liner could be produced of as shown in FIG. 3, Detail B. The liner would hold water, and include its own nozzle stub. The pet bowl design could remain the same if it was desired that the system work either with or without the liner, as the liner feed nozzle could pass through and extend past the existing nozzle on the water bowl. When attached to the tubing, water would be maintained in the bowl liner. If the system would be used only with the liner, then the nozzle on the pet bowl be might be replaced by a simple hole. (FIG. 3C) The disposable liner would then be placed in the bowl such that the nozzle stub on the liner passes through the hole in the pet bowl. When attached to the tubing, water level would be maintained in the liner. When the liner becomes dirty and/or slimy, it would be replaced with a clean one.

Although a particular embodiment of the invention has been described in detail for purposes of illustration, various modifications may be made without departing from the spirit and scope of the invention. Accordingly, the invention is not to be limited, except as by the appended claims.

I claim:

1. A continuous flow gravity operated water delivery system for a water reservoir, comprising:
   a water container having a lid and a raised bottom, said raised bottom having an opening adapted to accommodate a nozzle or section of tubing;
   a liner with a water feed nozzle adapted to fit inside said container with said nozzle in the vicinity of said opening; and
   water tubing having a first end adapted to be received on said nozzle and a second end adapted to extend to said reservoir whereby when said reservoir and said tubing are filled with water and said second end is placed in said reservoir a continuous flow gravity operated communication is established between said reservoir and said container.

2. A continuous flow gravity operated water delivery system as claimed in claim 1 and further including a weight adapted to be received on said second end of said tubing and to hold said tubing in place in said reservoir.

3. A continuous flow gravity operated water delivery system for maintaining a water reservoir at a predetermined level, comprising:
   a water container having a generally stable low profile with a raised bottom, a volume equal to a substantial percentage of the volume of said reservoir, and a nozzle, said raised bottom being below the level of water in said reservoir but raised sufficiently to accommodate said nozzle and a section of tubing above a supporting surface;
   water tubing having a first end adapted to be received on said nozzle and a second end adapted to extend into said reservoir whereby when said reservoir and said tubing are filled with water and said second end is placed in said reservoir a continuous flow gravity operated communication is established between said reservoir and said container; and
   a weight adapted to be secured to said second end of said tubing and to hold said second end in position in said reservoir.

* * * * *